(12) United States Patent
Taylor (10) Patent No.: US 7,775,570 B2
(45) Date of Patent: Aug. 17, 2010

(54) POLE-MOUNTED HOOK DEVICE FOR ELECTRIC UTILITY APPLICATIONS

(76) Inventor: Todd Taylor, P.O. Box 1122, Kodak, TN (US) 37764

( * ) Notice: Subject to any disclaimer, the term of this patent is extended or adjusted under 35 U.S.C. 154(b) by 377 days.

(21) Appl. No.: 11/868,754

(22) Filed: Oct. 8, 2007

(65) Prior Publication Data

US 2009/0091147 A1    Apr. 9, 2009

(51) Int. Cl.
*A47F 13/06* (2006.01)
*B25J 1/00* (2006.01)
(52) U.S. Cl. .......................... 294/19.1; 294/24; 81/53.1
(58) Field of Classification Search .............. 294/19.1, 294/24, 26, 22, 23; 81/3.8, 53.1
See application file for complete search history.

(56) References Cited

U.S. PATENT DOCUMENTS

| | | | |
|---|---|---|---|
| 1,370,651 A | 3/1921 | Johnson, Jr. | |
| 1,370,737 A | 3/1921 | Johnson, Jr. | |
| 1,430,053 A * | 9/1922 | Douglas | 81/3.8 |
| RE20,737 E | 5/1938 | Kehl | |
| 2,275,903 A * | 3/1942 | Hermann | 294/19.1 |
| 2,543,862 A | 3/1951 | Manahan | |
| 2,720,410 A | 10/1955 | Smith | |
| 2,824,190 A | 2/1958 | Mikos | |
| 3,866,965 A | 2/1975 | Homeier | |
| 4,132,441 A | 1/1979 | Watkins | |
| 5,564,852 A | 10/1996 | Maxwell et al. | |
| 5,742,220 A | 4/1998 | Scherer | |
| 5,773,777 A | 6/1998 | Scherer | |
| 5,861,595 A | 1/1999 | Wood et al. | |
| 5,998,748 A | 12/1999 | Taylor | |
| 6,453,775 B1 * | 9/2002 | Dietrich et al. | 81/53.1 |
| 6,474,197 B1 * | 11/2002 | Browen et al. | 81/3.8 |
| 6,483,060 B1 | 11/2002 | Taylor | |
| 6,512,442 B1 | 1/2003 | Taylor | |
| 6,642,464 B1 | 11/2003 | Taylor | |
| 7,185,561 B1 * | 3/2007 | Eastman | 81/3.8 |
| 2006/0150779 A1 | 7/2006 | Rider | |

OTHER PUBLICATIONS

Photograph of Tool for Electric Utility Applications, From a First View, Taken on or Before Jul. 12, 2006.
Photograph of Tool for Electric Utility Applications, From a Second View, Taken on or Before Jul. 12, 2006.

\* cited by examiner

*Primary Examiner*—Dean J Kramer
(74) *Attorney, Agent, or Firm*—Luedeka, Neely & Graham, PC (57) ABSTRACT

A hook device for coupling with a universal pole such as a utility pole or hot stick performs a plurality of functions including at least physically engaging a component of a utility device. The hook device has a base having an axis with a pole attachment for coupling with the universal pole. An arm extends from the base along the axis of the base at the arm's upper portion and bends at an elbow at a right angle extending in a forearm, which, together with the axis of the base define a first plane. A hook portion is connected to the forearm and has a geometry in a second plane at the first angle from the axis of the forearm. An end portion is connected to the hook portion and has the same axis as the forearm. A finger is angled from the axis of the forearm at the third angle and angled from the axis of the base at the second angle.

17 Claims, 6 Drawing Sheets

POLE-MOUNTED HOOK DEVICE FOR ELECTRIC UTILITY APPLICATIONS

FIELD

This disclosure relates to the field of electric utility tools. More particularly, this disclosure relates to a pole-mounted hook device for electric utility applications and a method for using the same.

BACKGROUND AND SUMMARY

Extension devices referred to as "hot sticks" have been used in conjunction with tools to perform various functions on difficult to reach utility devices. Often the utility devices are mounted high on a utility pole, and many carry electric current. Thus, utility workers are continuously in danger while working on utility devices such as power-lines transformers, fuse boxes, and many others. The utility worker uses an extension pole with an attachment portion at its distal end, which allows the utility worker to removably attach a utility tool to the end of the extension and raise the utility tool to the location of a utility device requiring maintenance. Typically, such utility tools have physical components designed to assist in manipulating the utility device in some physical manner while isolating the utility worker from electrical current.

In one utility device application, a mounting connected to an external electric circuit such as a power conduit, including has two terminals which connect across a fuse, typically referred to as a fuse limiter. The fuse limiter regularly requires replacement or maintenance. Such utility devices are normally mounted high on utility poles and near electrically conductive power lines. Therefore, a utility worker often uses an extension pole to manipulate the fuse limiter such that it can be replaced. However, the tools currently available for performing this task do not provide efficient and easy manipulation of the fuse limiter. Specifically, the tools require awkward and difficult manipulation in order to perform the various functions associated with removing or installing the fuse limiter.

The above and other needs are met by a hook device for coupling with an extension pole that performs a plurality of functions including at least physically engaging a component of a utility device. The universal pole has a device attachment portion having a plurality of teeth at its distal end.

The hook device has a base having an axis and a pole attachment end and an arm end. At the pole attachment end is a pole attachment portion for coupling with the universal pole. The pole attachment portion is a modified cylindrical prism having a major axis perpendicular to the axis of the base. The pole attachment portion also has two surfaces, one of which has a plurality of teeth for coupling with the plurality of teeth of the device attachment portion of the universal pole.

An arm extends from the base of the hook device along the axis of the base. The portion of the arm immediately next to the base is referred to as the upper arm, which bends at an elbow at a right angle extending in a forearm portion of the arm. The forearm, together with the axis of the base, define a first plane. A hook portion is connected to the forearm and has a geometry in a second plane at a first angle from the axis of the forearm. An end portion is connected to the hook portion and has the same axis as the forearm. A finger is angled from the axis of the forearm a fourth angle and angled from the axis of the base a second angle.

In some embodiments, the hook portion has a first and second connector portions each having axes. In these embodiments, the first connector portion is connected to the forearm portion and the axis of the first connector portion is angled at a third angle from the axis of the forearm portion. The hook portion is connected in between the first connector portion and the second connector portion and has an axis substantially parallel to the axis of the forearm portion. Together, the axes of the first and second connector portions and the hook portion define a second plane, which is at the first angle from the first plane. The first angle is not equal to zero, which, in other words indicates that the first plane and the second plane are not the same plane. In these embodiments, the axis of the end portion is angled substantially at the third angle from the axis of the second connector portion.

In some embodiments, the arm has an end piece connected to the end portion for preventing the component of the utility device from disengaging the hook device while the hook device is in use and engaging the component. In some embodiments, the fourth angle and the third angle are substantially the same. In some embodiments, the second angle is greater than the first angle and in some exemplary embodiments the first angle is about 45 degrees and the second angle is in the range from about 75 to about 80 degrees. In yet other embodiments, the first and second angles are substantially the same, and in yet other embodiments, the third angle is in the range from about 45 degrees to about 60 degrees.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
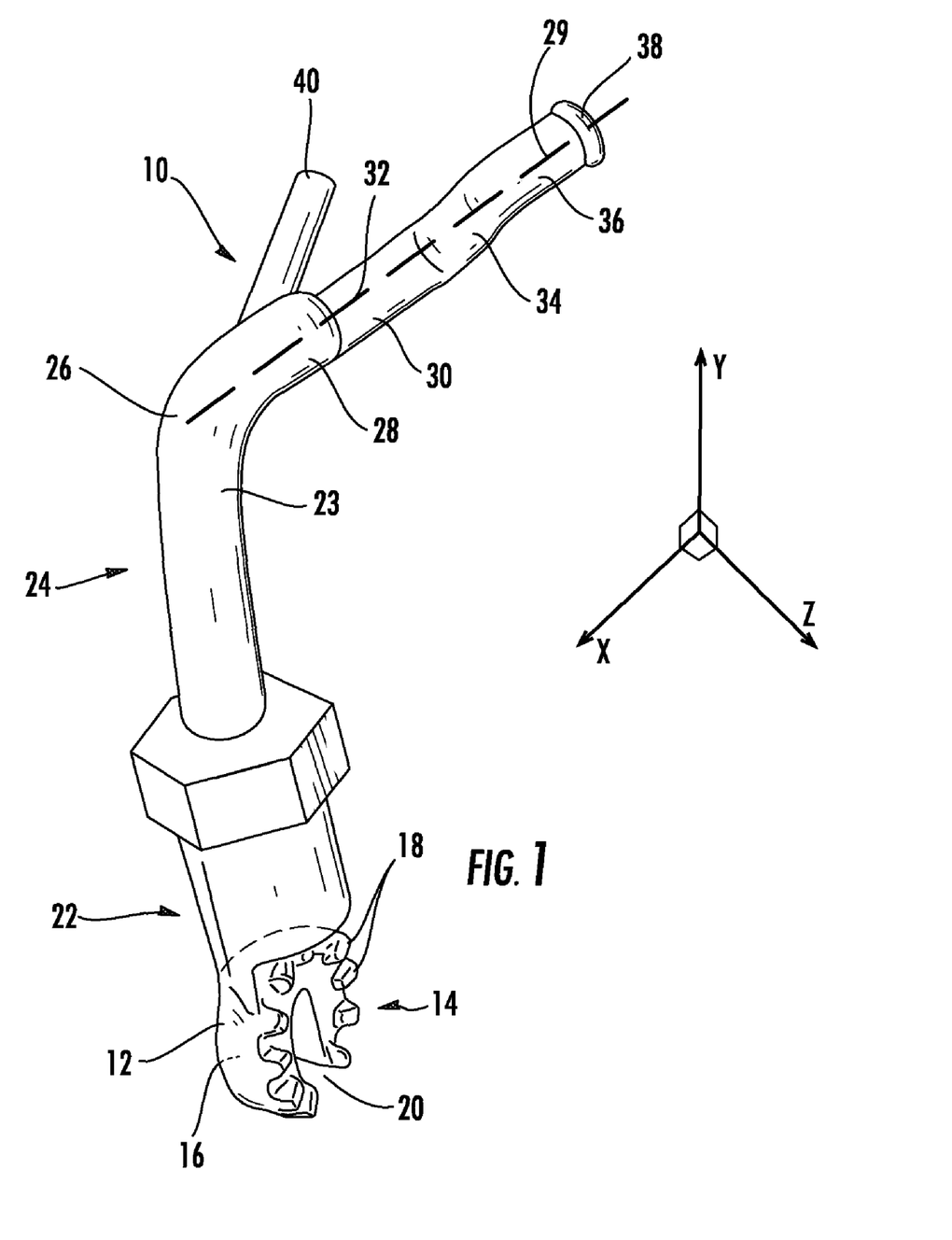
FIG. 1 is a perspective view of a hook device according to the disclosure.
Figure 2:
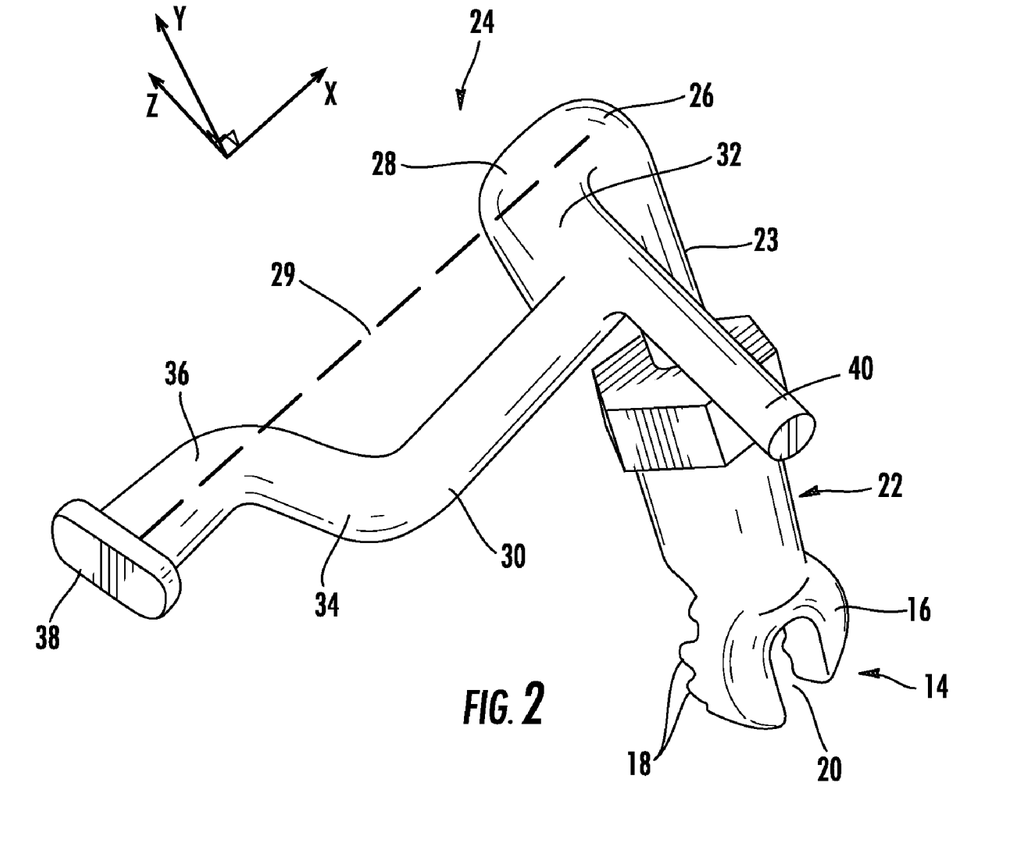
FIG. 2 is another perspective view of the hook device of FIG. 1.
Figure 3:
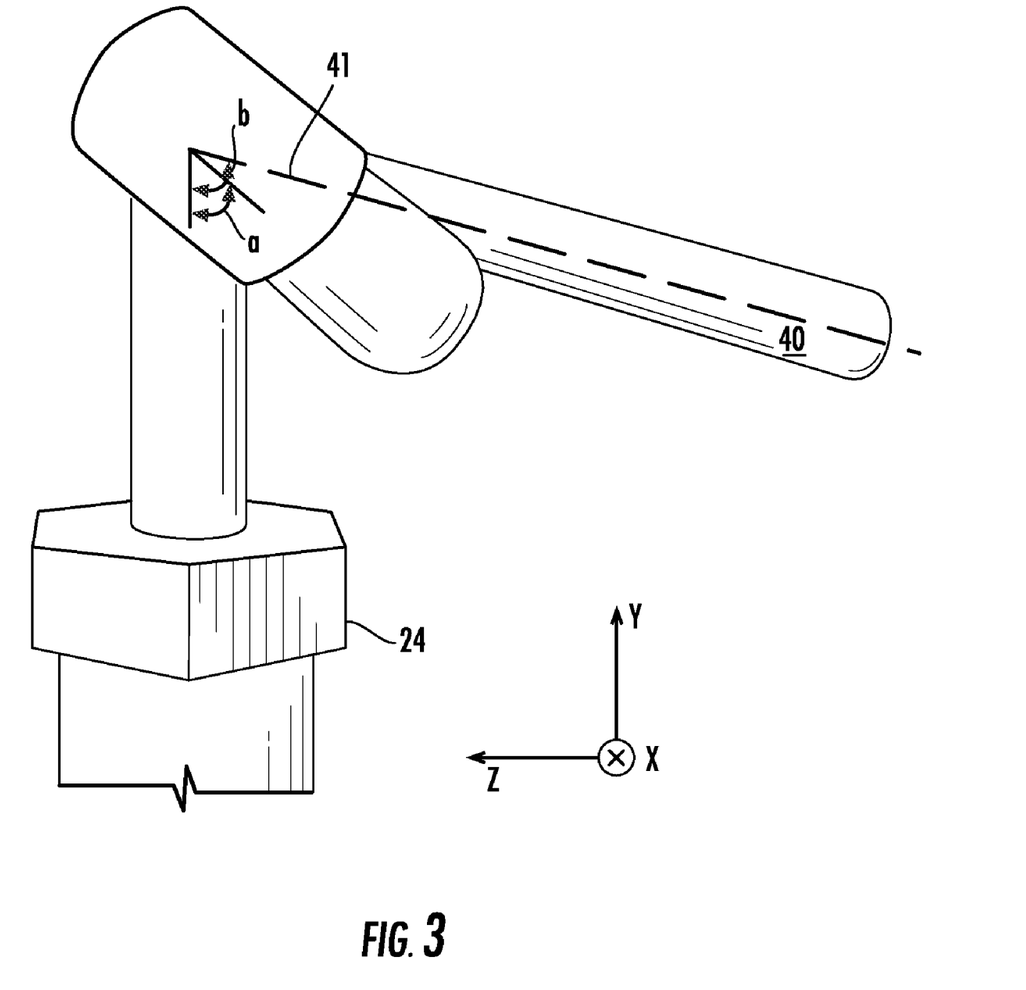
FIG. 3 is a plan view of the hook device looking down its arm.

Perspective views of a hook device 10 for mounting on an extension pole are shown in FIGS. 1 and 2. FIG. 3 shows the hook device 10 from a top plan view. With collective reference to FIGS. 1-3, the hook device 10 has an attachment portion 12, substantially in the form of a cylindrical prism having two opposite substantially flat sides 14 and 16 the surface of the sides defining a device plane, as indicated in FIG. 1 by the X-Y plane. One side 14 of the attachment portion 12 has a plurality of teeth 18 for coupling with teeth of a receiving portion (not shown) of a mounting pole such as a utility pole also referred to as a "hot stick." The attachment portion 12 has a fastening aperture 20 removed radially from a center of the attachment portion such that a fastener may be used to couple the attachment portion to the receiving portion of a mounting pole. The fastener may be a nut and bolt combination or other type of fastening apparatus.

The pole attachment portion 12 is part of a body 22 of the hook device 10. An upper portion 23 of an arm 24 of the hook device 10 extends from the body 22 upwardly in the positive-Y direction and bends at substantially a right angle at an elbow 26, continuing in the negative-X direction for a forearm portion 28. The forearm portion 28 has a major axis, which is shown in FIG. 2 as dotted line 29. The major axis of the forearm portion 28 is also substantially the major axis of an end portion 36. The arm 24 has a hook portion 30 that lies in a plane extending at the first angle to the X-Y plane as illustrated in FIG. 3. In other words, the hook portion 30 lies in a plane angled about (180—the first angle) degrees measuring in the Z-Y plane from the positive-Y axis.

The structure of the arm 24 may be illustrated in further detail by reference to FIG. 3, wherein the X-axis is perpendicular to the surface of the figure and the positive-X axis goes into the figure as indicated by the circle-X on the axes. FIG. 3 is a view of the arm 24 of the hook device 10 looking down the major axis 29 of the forearm 28, which is parallel to the X-axis. Beyond its elbow 26, the arm 24 of the hook device 10 generally extends in the negative-X direction as discussed above. The hook portion 30, in addition to a first hook connector 32 and a second hook connector 34, has major axes which lie substantially in a single plane. That plane extends at the first angle from the X-Y plane.

Figure 4:
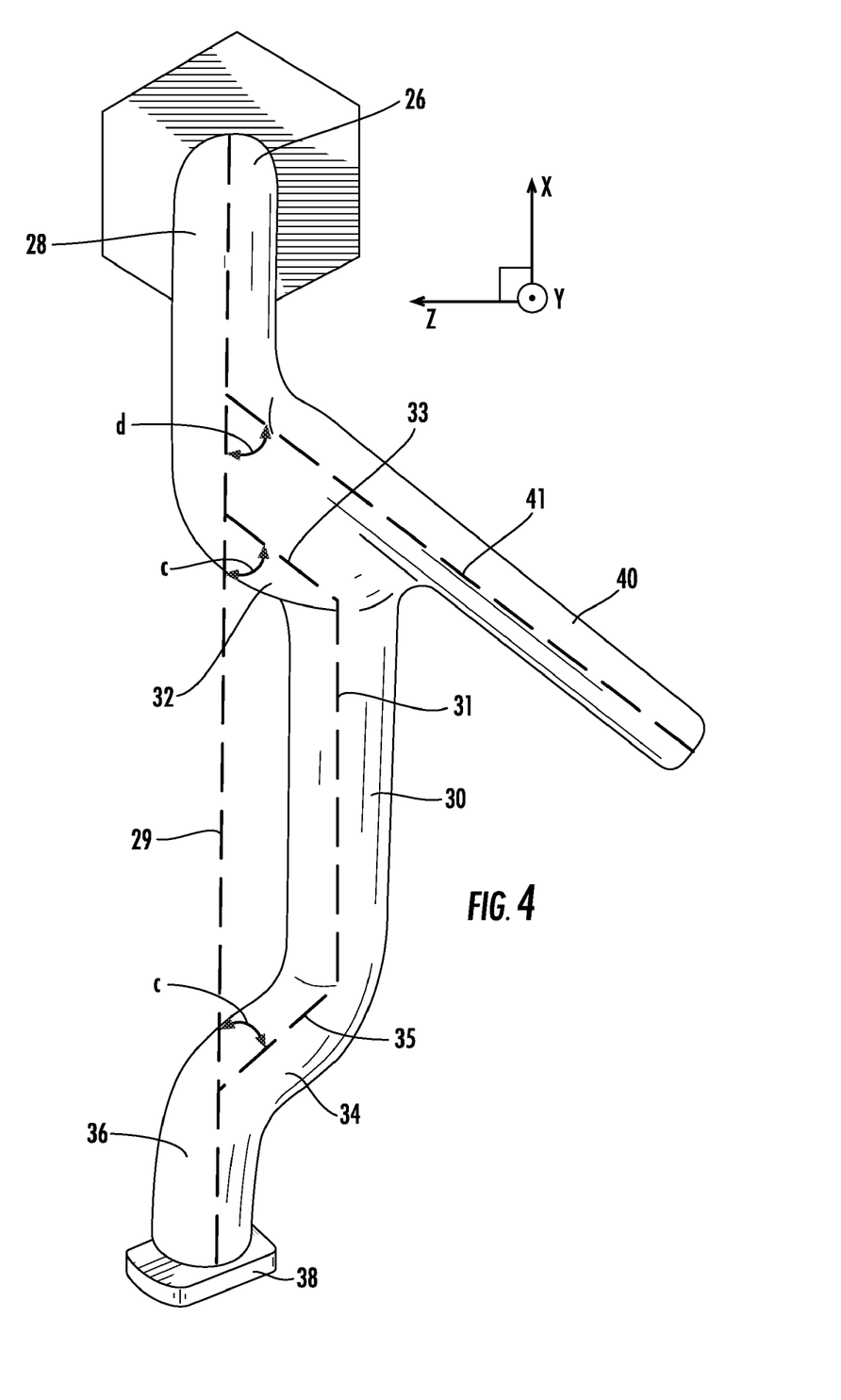
FIG. 4 is an overhead plan view of the hook device.

Referring to FIG. 4, the hook portion 30 extends from the forearm portion 28 via the first hook connector 32. A major axis of the first hook connector 32, as represented by dotted line 33, is bent at the third angle from the major axis of the forearm portion 28, which is in the negative X-direction. The hook portion 30, having a major axis represented by dotted line 31 and which is substantially parallel to the major axis 29 of the forearm portion 28, extends to a second hook connector 34, which has a major axis represented by dotted line 35 is also bent at the third angle from the forearm portion 28 and then extends to the end portion 36, which has substantially the same major axis 29 as the forearm portion 28. The end portion 36 has an end piece 38, which functions to prevent a loop, ring or other utility apparatus from slipping off the end portion 36 of the hook device 10 while it is in use. In an exemplary embodiment, the third angle, which is measured in the Z-X plane, is about 45 degrees.

With continued reference to FIG. 4, the major axis of finger 40 as represented by dotted line 41 is substantially bent from the major axis of the forearm 29 at the third angle. However, with reference to FIG. 3, the major axis 41 of the finger 40 is bent at the second angle from the Y-axis, whereas the major axes 33, 31, and 35 of the first hook connector 32, the hook portion 30, and the second hook connector 34 respectively (all of FIG. 4) are bent at the first angle from the Y-axis as discussed above. In an exemplary embodiment, the second angle is greater than the first angle, and in an especially exemplary embodiment the first angle is about 45 degrees and the second angle is between about 75 and about 80 degrees. In some embodiments, the first angle and the second angle are substantially the same and in some embodiments, the second angle is less than the first angle.

In other embodiments, the hook device 10 does not have first and second connector portions 32 and 34, but rather has one singular hook portion 30 that connects to both the forearm 28 and the end portion 36. Such embodiments include hook portions having a substantially curved geometry such as a semicircular geometry or an arcing or otherwise curved geometry. In yet other embodiments, the hook portion 30 has a combination of straight members and curved members. For example, in one embodiment, the first and second connector portions 32 and 34 are present and the hook portion is a curved member, semicircular, acing or otherwise curved. In other embodiments, the portion of the arm 24 between the forearm 28 and the end portion 36 has several sections, for example five sections each angled in equiangular geometries to one another forming a hook or trough for physically receiving a component of the utility device to be worked upon, such as the loop 64 of the fuse limiter 54 as discussed regarding FIGS. 5 and 6 below.

In some embodiments, the finger 40 of the arm 24 is substantially cylindrical and in other embodiments it is a polygonal prism such as a rectangular prism or otherwise shaped prism, such as an oval prism. Likewise, in some embodiments, the other components of the arm, for example the upper portion 23, the forearm 28, the first connector portion 32, the hook portion 30, the second connector portion 34, and the end portion 36 are cylindrical prisms, but in other embodiments the components are each a polygonal prism such as a rectangular prism or otherwise shaped prism such as an oval prism or a combination of the above.

Figure 5:
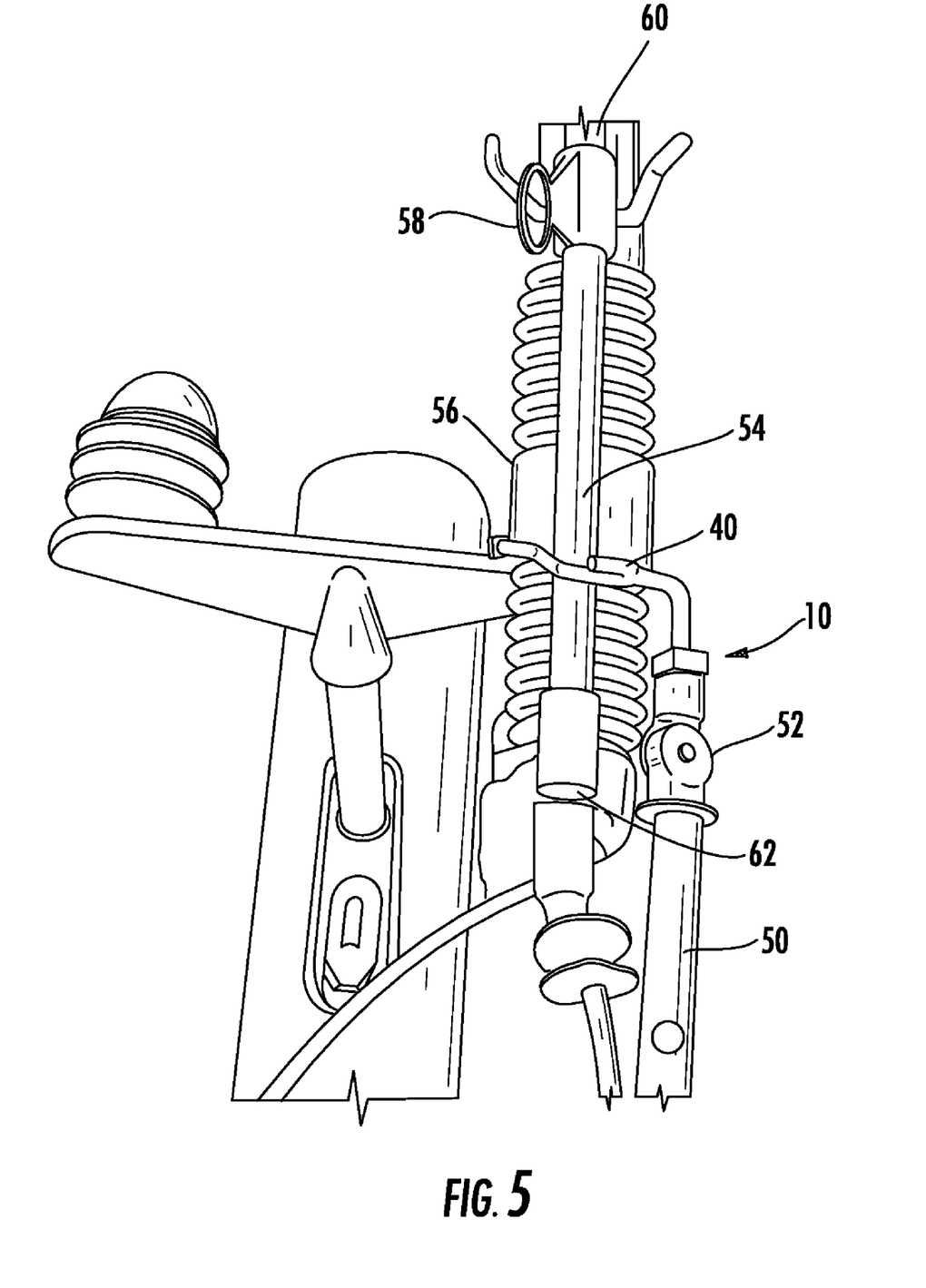
FIG. 5 is an illustration of another embodiment of the hook device coupled with a universal pole and being used to perform a function on a utility device.

With reference to FIG. 5, the hook device 10 is shown attached to an extension pole 50, which in an exemplary embodiment is a "hot stick". The pole attachment portion 14 of the hook device is coupled with a similar attachment portion at a distal end of the pole 50. The teeth 18 of the pole attachment portion 14 function to prevent the hook device 10 from moving with respect to the pole 50 after having been coupled with the pole 50. The embodiment shown in FIG. 5 is a different embodiment than shown in FIGS. 1-4 in that the arm 24 of the hook device 10 is rotated 180 degrees about the y-axis (FIG. 1-4) such that it extends in an opposite direction from the embodiment shown in FIGS. 1-4. This embodiment of the hook device 10 may be beneficial in different applications than the previously discussed embodiments. Additionally, this embodiment may be more comfortable for a user of the hook device 10 when coupled with a pole 50. For example, a right-handed user may feel more comfortable handling a hook device 10 such as that illustrated in FIGS. 1-4 whereas a left-handed user may feel more comfortable handling a hook device 10 such as that illustrated in use in FIGS. 5 and 6 or vice-versa.

Referring back to FIG. 5, a fuse limiter 54 is shown attached to a mounting 56. In various utility operations and applications, devices such as the fuse limiter 54 must be manipulated physically. For example, when a current surge results in a "blown" or open fuse within the fuse limiter 54, the fuse limiter may require maintenance. Such maintenance typically includes repairing or replacing the fuse within the fuse limiter 54. In order to do so efficiently and safely, a utility worker typically removes the fuse limiter 54 from the mounting 56 from the ground or from a location relatively distant from the mounting 56.

This is done by use of a utility tool referred to as a "hot stick," (herein referred to as a hot stick or extension pole 50) which is appropriately named for its ability to remove the possibility of electrical shock from utility device when the worker uses the hot stick to make contact with an electrically conductive utility device. The finger 40 of the hook device 10 is used to engage a ring 58 of the fuse limiter 54 in order to detach the fuse limiter from the mounting 56 at the upper end 60 of the fuse limiter 54 and interrupt the electrical circuit.

Figure 6:
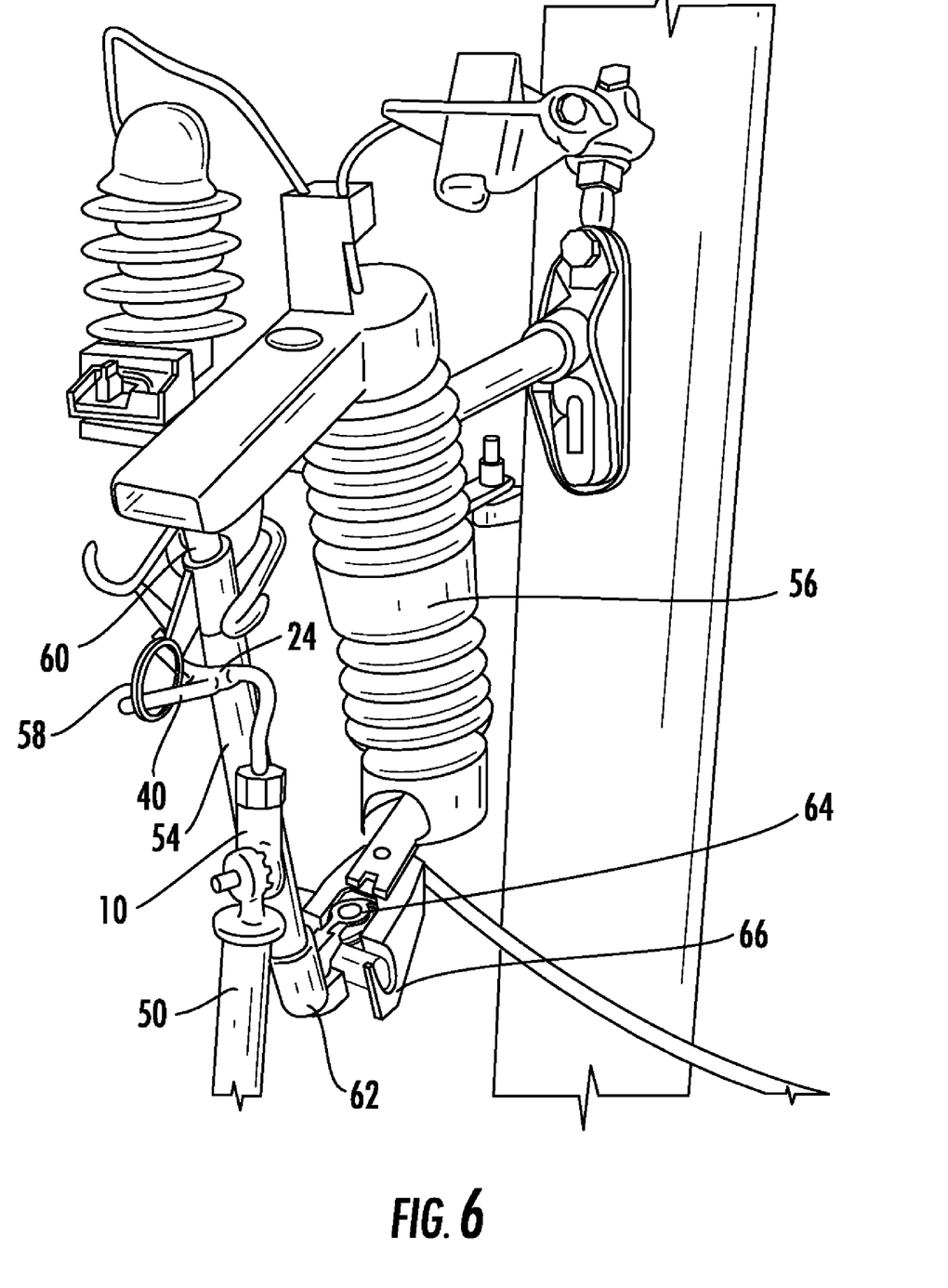
FIG. 6 is an illustration of the embodiment of the hook device shown in FIG. 5 and coupled with a universal pole and being used to engage the ring of the fuse limiter.

Referring now to FIG. 6, typically fuse limiters 54 rotate at their bottom end 62 about a shaft or axis 64, which is removably attached to a shaft receiver 66 of the mounting 56. Thus, once the ring 58 has been used to disengage the upper end 60 of the fuse limiter 54 from the mounting 56, the fuse limiter 54 swings downward about the shaft 64 by rotating within the shaft receiver 66. This motion may be guided and the speed of such motion may be regulated by continued use of the hook device 10 engaging the ring 58.

For example, a process for disengaging and removing the fuse limiter 54 from the mounting 56 is discussed below. First, the finger 40 of the hook device 10, as shown in FIG. 6, is manipulated by the utility worker holding the pole 50 so that the finger 40 of the hook device engages the ring 58 by passing through the ring 58. The utility worker may manipulate the pole 50 coupled with the hook device 10 in order to disengage the upper end 60 of the fuse limiter 54 from the mounting 56. The fuse limiter 54, because of the force of gravity, then tends to swing downward about the shaft 64. The hook device may be used to guide the fuse limiter in a cautious and controlled motion from the closed position (wherein the upper end 60 of the fuse limiter 54 engages the mounting) to a fully open position (wherein the fuse limiter 54 is hanging solely from the shaft receiver 66 by its shaft 64.

At this point, the utility worker then disengages the finger 40 of the hook device 10 from the ring 58 of the fuse limiter 54 and manipulates the hook device 10 such that the arm 24 of the hook device engages and passes through the opening of a loop 64 proximate to the lower end 62 of the fuse limiter. Applying an upward force against the pole 50, the utility worker manipulates the hook device 10 to apply push the look 64 of the fuse limiter 54 upward. This results in the shaft 64 of the fuse limiter 54 to disengage the shaft receiver 66 of the mounting 56. The hook device 10 has the fuse limiter 54 engaged and hanging by its loop 64 free from the mounting 56 and carefully brings the fuse limiter down from the utility device for inspection and maintenance.

In a similar and substantially opposite process to the fuse limiter 56 removal process discussed above, the fuse limiter is raised and properly engaged with the mounting 56. First, the utility worker attaches the hook device 10 to the pole 50 if necessary. Next, the worker hangs the fuse limiter 56 on the arm 24 of the hook device 10 such that the loop 64 of the fuse limiter 54 rests securely within the trough created by the hook portion 30 and its first and second hook connectors 32 and 34 respectively (FIGS. 1, 2 and 4). The utility worker then raises the pole 50 having a coupled hook device 10 holding the fuse limiter 54 toward the mounting 56. The utility worker then carefully manipulates the pole 50 such that the shaft 64 of the fuse limiter 54 comes to rest inside the shaft receiver 66. Next, the utility worker manipulates the pole 50 such that the hook portion 30 of the arm 24 is removed from the loop 64 of the fuse limiter 54. At this point, the fuse limiter 54 is hanging and swinging by its shaft from the shaft receiver 66.

In the next step of the process, the utility worker manipulates the pole 50 such that the finger 40 of the hook device 10 engages the ring 58 of the hanging fuse limiter 54. By applying an upward force on the universal pole 50, the utility worker rotates the fuse limiter 54 about its shaft 64 and upward such that the upper end 60 of the fuse limiter 54 engages and connects with the mounting 56. Finally, the utility worker disengages the finger 40 of the hook device 10 from the ring 58 of the fuse limiter 54 and removes the pole 50 coupled with the hook device 10 from the proximity of the utility device.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A hook device for coupling with an extension pole having a device attachment portion having a plurality of pole teeth at its distal end and performing a plurality of functions including at least physically engaging a component of a utility device, the hook device comprising:
    (a) an elongate base having an arm end and a pole attachment end and having a major axis;
    (b) a pole attachment portion connected to the elongate base near the pole attachment end being a modified cylindrical prism shape with a major axis normal to the major axis of the elongate base, a first surface, and a second surface having a plurality of teeth for coupling with the plurality of teeth of the device attachment portion of the extension pole; and
    (c) an arm extending from the arm end of the elongate base and comprising:
        (i) an upper portion extending from the arm end of the elongate base substantially along the major axis of the elongate base;
        (ii) an elbow connected to the upper portion such that the arm is bent substantially perpendicular to the major axis of the elongate base;
        (iii) a forearm portion connected to the elbow and having an axis substantially perpendicular to the major axis of the elongate base, the major axis of the elongate base and the axis of the forearm defining a first plane;
        (iv) a first connector portion having an axis and connected to the forearm portion, the axis of the first connector portion angled at a third angle of from about 45 degrees to about 60 degrees from the axis of the forearm portion;
        (v) a hook portion connected to the first connector portion and having an axis substantially parallel to the axis of the forearm portion, the axis of the first connector portion and the axis of the hook portion defining a second plane angled at a first angle from the first plane wherein the first angle is not equal to zero; and
        (vi) a second connector portion having an axis and connected to the hook portion, the axis of the second connector portion lying substantially within the second plane;
        (vii) an end portion having an axis and connected to the second connector portion, wherein the axis of the end portion is substantially the same as the axis of the forearm and the axis of the end portion is angled substantially at the third angle from the axis of the second connector portion.

2. The hook device of claim 1 wherein the arm further comprises an end piece connected to the end portion for preventing the component of the utility device from disengaging the hook device while the hook device is in use and engaging the component.

3. The hook device of claim 1 wherein the arm further comprises an elongate finger having an axis angled from the axis of the forearm at a fourth angle.

4. The hook device of claim 3 wherein the fourth angle and the third angle are substantially the same.

5. The hook device of claim 1 wherein the arm further comprises an elongate finger having an axis angled from the axis of the elongate base a second angle.

6. The hook device of claim 5 wherein the second angle is greater than the first angle.

7. The hook device of claim 5 wherein the second angle is in the range from about 75 to about 80 degrees.

8. The hook device of claim 1 wherein the first angle is about 45 degrees.

9. The hook device of claim 5 wherein the first angle is about 45 degrees.

10. The hook device of claim 5 wherein the first angle and the second angle are substantially equal.

11. A hook device for coupling with a universal pole having a device attachment portion having a plurality of pole teeth at its distal end and performing a plurality of functions including at least physically engaging a component of a utility device, the hook device comprising:
   (a) an elongate base having an arm end and a pole attachment end and having a major axis;
   (b) a pole attachment portion connected to the elongate base near the pole attachment end being a modified cylindrical prism shape with a major axis normal to the major axis of the elongate base, a first surface, and a second surface having a plurality of teeth for coupling with the plurality of teeth of the device attachment portion of the universal pole;
   (c) an arm extending from the arm end of the elongate base and comprising:
      (i) an upper portion extending from the arm end of the elongate base substantially along the major axis of the elongate base;
      (ii) an elbow connected to the upper portion such that the arm is bent substantially perpendicular to the major axis of the elongate base;
      (iii) a forearm portion connected to the elbow and having an axis substantially perpendicular to the major axis of the elongate base, the major axis of the elongate base and the axis of the forearm defining a first plane;
      (iv) a first connector portion having an axis and connected to the forearm portion, the axis of the first connector portion angled substantially at a third angle of from about 45 degrees to about 60 degrees from the axis of the forearm portion;
      (v) a hook portion connected to the first connector portion and having an axis substantially parallel to the axis of the forearm portion, the axis of the first connector portion and the axis of the hook portion defining a second plane angled at the first angle from the first plane wherein the first angle is not equal to zero;
      (vi) a second connector portion having an axis and connected to the hook portion, the axis of the second connector portion lying substantially within the second plane;
      (vii) an end portion having an axis and connected to the second connector portion, wherein the axis of the end portion is substantially the same as the axis of the forearm and the axis of the end portion is angled substantially at the third angle from the axis of the second connector portion; and
      (viii) an elongate finger connected to the arm near the first connector portion and having an axis angled from the axis of the forearm at a fourth angle and angled from the major axis of the elongate base at the second angle.

12. The hook device of claim 11 wherein the third angle and the fourth angle are substantially the same.

13. The hook device of claim 11 wherein the second angle is greater than the first angle.

14. The hook device of claim 11 wherein the second angle is in the range from about 75 to about 80 degrees.

15. The hook device of claim 11 wherein the first angle is about 45 degrees.

16. The hook device of claim 11 wherein the first angle is about 45 degrees.

17. The hook device of claim 11 wherein the first angle and the second angle are substantially equal.

* * * * *